(No Model.)
S. ARTEAGA & E. DEL VALLE.
COMBINED COAL CART AND WEIGHING SCALE.
No. 354,998. Patented Dec. 28, 1886.
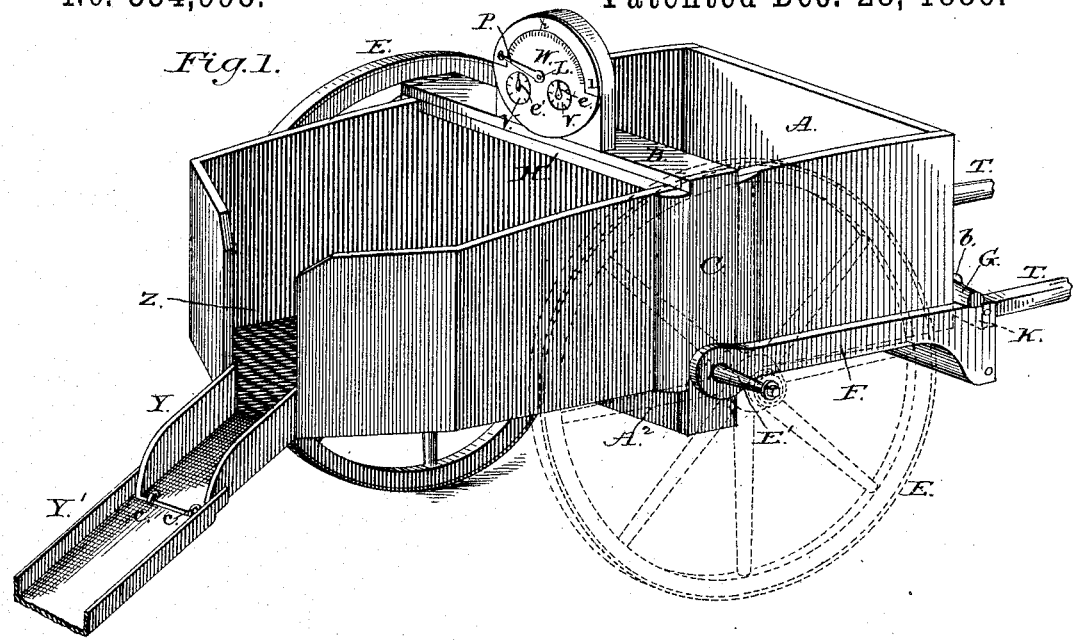
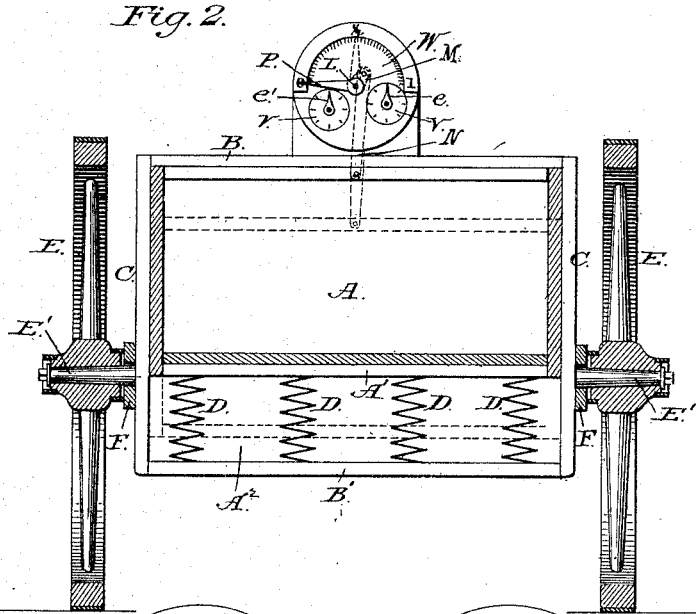
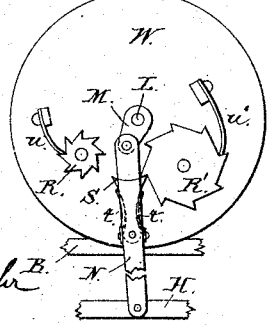
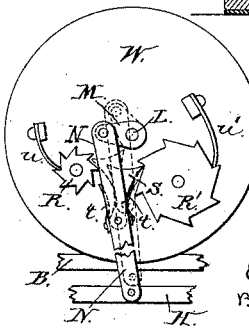
Attest:
John A. Ellis
A. F. Chandler
Inventors,
Serapio Arteaga
Eliseo del Valle
By Daniel A. Burr
Atty.

UNITED STATES PATENT OFFICE.

SERAPIO ARTEAGA AND ELISEO DEL VALLE, OF NEW YORK, N. Y.

COMBINED COAL-CART AND WEIGHING-SCALE.

SPECIFICATION forming part of Letters Patent No. 354,998, dated December 28, 1886.

Application filed April 22, 1886. Serial No. 199,835. (No model.)

*To all whom it may concern:*

Be it known that we, SERAPIO ARTEAGA and ELISEO DEL VALLE, both residents of the city, county, and State of New York, have invented new and useful Improvements in a Combined Coal-Cart and Weighing-Scale; and we do hereby declare that the following is a full and exact description thereof, reference being had to the accompanying drawings, and to the letters of reference marked thereon, making a part of this specification, in which—

Figure 1 is an elevation in perspective of our improved coal weighing and registering cart; Fig. 2, a transverse section taken longitudinally through its axle; Fig. 3, a detached rear elevation of the mechanism for operating the indicating and registering dials, and Fig. 4 a similar view illustrating a change in the positions thereof.

Our invention relates to that class of carts or vehicles in which the body is supported upon springs combined with a weighing apparatus to indicate the weight of the load placed thereon.

It has for its object to provide in a simple and economical form a two-wheeled cart for the delivery of coal, which shall be constructed with a weighing apparatus so arranged as that it will not only indicate the weight of coal loaded into the cart, but when the load is delivered will register the same upon suitable dials, so that the number of deliveries made in a day and the total weight thereof will be registered for reference.

In the accompanying drawings, A represents the body of a two-wheeled coal-cart of any suitable form, and preferably of such dimensions as that it will contain one ton of coal.

B is the upper cross board or bar, B' the lower cross-bar, and C C the side bars, of a suspension-frame, within which the body A is supported upon a series of spiral springs, D D, preferably four in number, and each adapted to carry one-fourth of a ton weight. These springs are interposed between the lower bar, B', and a central bolster-bar, A', under the bottom of the body. The suspension-frame B B' C C is mounted upon the wheels E E of the cart by means of spindles E' E', secured to the lateral bars of the frame, to project therefrom in a right line with each other, at a distance above the lower bar, B', equal to the height of the springs, as shown in Fig. 2; or the spindles may form the ends of a cranked axle bent at each end to pass under the bar B' and support the same. The springs D D and the lower bar, B', are inclosed between two parallel side plates or boards, A², made fast to the under side of the body, to project therefrom, forming virtually a box whose bottom and ends are formed by the bar B' and side bars, C C, and whose sides and top are formed by the projecting plates and the portion of the bottom of the cart-body included between them.

F F are the side bars, pivoted each at one end to one of the axial spindles E' E', and which are made to extend thence to the front of the body, where they are connected together by a cross-piece, K, to which the shafts T T are secured. The body is thus left free to play up and down between the side bars, the line of draft of the shafts upon the axes of the wheels being constant and direct, irrespective of the position of the body. The axial spindles E' E' serve as pivots upon which the body of the cart may turn for dumping, and the front end of the cart is secured, to prevent it from tipping, by means of the cross-piece K and a loose bar, G, which is led in the customary manner at each end through a staple, $b$, projecting from the cross-piece K, (see Fig. 1,) through blocks secured to the body, or similar equivalent devices forming no part of this invention. A fixed bar, H, is secured across the top of the body to extend from one side thereof to the other under the upper board or bar, B, of the axial frame.

A vertical dial-plate, W, is fixed upon the upper bar or board, B, of the frame, mounted on the axle, and a spindle, L, is fitted to rotate in suitable bearings at the center thereof. The inner end of the spindle L terminates in a crank-arm, M, whose outer end is connected by a rod, N, to the cross-bar H, attached to the body, and the crank is so adjusted as that, as the cart-body A drops away from the upper bar, B, by reason of the load placed thereon, the crank-arm M will be turned from its upper to its lowermost position, over an arc somewhat less than a half-circle, to avoid a dead-point at either end of its stroke. A semi-rotation of the spindle L will thus be produced, and this movement of the spindle will be indicated upon the face of the dial W by means of an index-hand, P, fixed on the end of the spindle to sweep over a scale marked upon the dial-face, and which is marked to indicate one ton at a full stroke of the hand, and is subdivided to indicate, by the proportional movements of the hand, proportional divisions of the ton, so that when a half-ton is loaded into the cart the hand will sweep over one-half of the scale and point to the figures of the scale indicating a half-ton.

To provide for the registration of the amount delivered from the cart—as, for example, to register each ton or half-ton so delivered—two ratchet-wheels, R and R', of different diameters are pivoted upon the rear of the dial-plate W, one on either side of the crank-rod N. The spindles which carry the ratchet-wheels R R' pass through the dial-plate and carry, respectively, pointers e e' upon their opposite ends. Spring-pawls u and u', fixed to the dial-plate W, engage, respectively, the teeth of the ratchet-wheels R R', to prevent a reverse movement thereof, and are made so to bear upon the periphery of each wheel as to prevent it from moving easily. The smaller wheel, R, is so located with reference to this bar N and its line of movement as that, when the bar is depressed one-half its stroke, and thereby swung over to one side of the center, it will cause a double-headed pawl, S, pivoted to one side of the rod N and automatically maintained by springs t t in a position central to this side of the rod, to engage a tooth of the smaller ratchet-wheel, R, so that when the rod N moves up to its first position it will cause said wheel to rotate a distance proportionate to the length of said movement. The number of teeth upon the ratchet R is such as that each half-stroke upward of the rod N will bring a tooth into position to be engaged by the pawl on the rod when it next drops half its stroke. The dial V, over which the pointer e, carried by the spindle of the ratchet R, moves, is so graduated as that each movement of the ratchet will carry the pointer from one division thereof to the next, so that its position will indicate the number of half-strokes the rod has made since the pointer was last set to zero. When, however, the rod N drops its full stroke, by reason of the loading of the cart with a full ton of coal, the pawl S on the rod will be carried down past the smaller ratchet-wheel, R, (the springs t t, governing the pawl, allowing it to yield sufficiently to pass readily by the projecting ratchet-tooth thereon,) and as the rod swings toward the central line the pawl will be carried toward and past the proximate tooth of the larger ratchet-wheel, R', the tooth being held in position by the spring-pawl u, which engages the wheel, so that when the rod N moves upward it will cause the wheel to turn. The engagement of the pawl S with this larger wheel, R', will operate to swing the pawl clear of the proximate tooth in the smaller wheel, R, until it has passed clear of the latter, as shown in Fig. 4.

The pointer e', carried by the larger ratchet-wheel, R', serves to indicate in the same manner as that of the smaller wheel the number of full strokes made by the rod since the pointer was last placed at zero.

The cart is made more complete by pivoting to its rear end a swinging chute, Y. This chute Y is pivoted to the edge of the bottom piece of the box of the cart, so as to swing up and cover and close an opening, Z, at its rear end. When the load is to be dumped into a coal-hole, the chute Y is swung out to the hole, so that the coal falling out through the opening Z in the rear end of the cart will pass down the chute to the hole. A second section, Y', may be hinged to the first section, Y, of the chute by detachable hooks c c, so as to extend it if need be. In throwing out the chute the weight thereof tends to facilitate the tipping of the cart backward.

In the use of my invention the index-hand P of the scale will point to zero when the cart is empty, and the hands e and e' of the ton and half-ton registers are set each at zero before the delivery of coal to any one party is commenced. Each time the cart is loaded thereafter the index-hand P will indicate when the proper weight has been placed therein. If but a half-ton is loaded, the springs D D will be depressed but about one half and the rod N drawn down one half its full stroke only, so that its pawl S will be brought in position to engage only the small ratchet-wheel R, actuating the pointer e on the one-half-ton-registering dial. So soon as the cart is emptied, so as to allow the rod N to rise, its upward movement will carry the pointer e on said register forward one point or division of the scale. If a full ton be placed in the cart, the rod N being fully depressed by the dropping of the body A its pawl S will be carried down and over into engagement with the large ratchet-wheel R', actuating the pointer of the one-ton register, and so soon as the cart is emptied will, in moving up, turn said ratchet-wheel R' one point and move its pointer e' over one division of the one-ton-registering dial.

We are aware that carts and cars mounted upon springs interposed between the body and axle have heretofore been fitted with pointers or index-fingers attached to the body to move over scales attached to a support carried directly upon the axle, and that this arrangement has likewise been reversed, so that the scale is upon the yielding part or body and the pointer upon a fixed portion carried by the axle. We do not therefore claim, broadly, the combination of the one part or index of a scale with the axle and the other part or dial with the body of a cart. Our invention relates to the construction and arrangement, in a two-wheeled coal-cart, of a central transverse bar carried by a frame mounted upon the two wheels of the vehicle, and within which the cart-body is mounted, and provided with a dial fixed upon said bar, over which moves an index-pointer actuated, as described, by the changes in the relative position of the body to said bar under varying loads, whereby the one single dial is brought prominently into view at a central point in connection with the cart to indicate clearly the weight of the load without any interference with the loading or unloading of the cart or its management.

We claim as our invention—

1. The suspension-frame C, mounted upon the cart-wheels E E and within which the cart-body A is centrally mounted, springs D D, interposed between the body and the lower bar of the frame, the dial-plate W upon the upper bar of the frame, the index-hand P, revolving in a half-circle over the dial, the crank-spindle L, carrying said index-hand, and the rod N, connecting the crank of the spindle with the cart-body, all substantially in the manner and for the purpose herein set forth.

2. The combination, with the body of a weighing-cart, its wheels, a frame mounted upon the wheels, within which the body is suspended, springs interposed between the body and frame, a dial-plate secured to the upper bar of the frame, a cranked spindle rotating on said dial-plate, and a rod, N, secured to the body at one end and at the other to the crank-arm of said spindle, of the ratchet-wheels R R', mounted on each side of the rod N, pointers carried by their spindles, fixed pawls $u\,u'$, controlling said ratchets to prevent a reverse movement thereof, a double-headed pawl, S, pivoted to the face of the rod N, to engage said ratchet-wheel, and springs $t\,t$, controlling said pawl, all substantially in the manner and for the purpose set forth.

In testimony whereof we have signed our names to this specification in the presence of two subscribing witnesses.

SERAPIO ARTEAGA.
ELISEO DEL VALLE.

Witnesses:
JOHN A. ELLIS,
A. F. CHANDLER.